(12) United States Patent
Sato

(10) Patent No.: US 10,791,244 B1
(45) Date of Patent: Sep. 29, 2020

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventor: Koichi Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/513,716

(22) Filed: Jul. 17, 2019

(30) Foreign Application Priority Data

Mar. 22, 2019 (JP) .................................. 2019-055648

(51) Int. Cl.
*G06K 15/00* (2006.01)
*H04N 1/387* (2006.01)
*H04N 1/00* (2006.01)
*H04N 1/32* (2006.01)

(52) U.S. Cl.
CPC ......... *H04N 1/3875* (2013.01); *H04N 1/0044* (2013.01); *H04N 1/00411* (2013.01); *H04N 1/32368* (2013.01)

(58) Field of Classification Search
CPC ............. H04N 1/3875; H04N 1/00411; H04N 1/0044; H04N 1/32368
See application file for complete search history.

(56) References Cited

U.S. PATENT DOCUMENTS

| 9,832,346 | B2 | 11/2017 | Hirai et al. | |
| 2013/0100060 | A1* | 4/2013 | Iwaizumi | G06F 3/04883 |
| | | | | 345/173 |

FOREIGN PATENT DOCUMENTS

| JP | 2007226333 | 9/2007 |
| JP | 2016206926 | 12/2016 |

* cited by examiner

*Primary Examiner* — Moustapha Diaby
(74) *Attorney, Agent, or Firm* — JCIPRNET

(57) ABSTRACT

An information processing apparatus includes: a display section that displays an image; an instruction section that instructs an operator on information to be input; a detecting section that detects a designation position on the display section on which the image is displayed; and an input section that inputs input information corresponding to the information to be input instructed by the instruction section, in a region determined by a designation start position and a designation end position in the image.

13 Claims, 11 Drawing Sheets

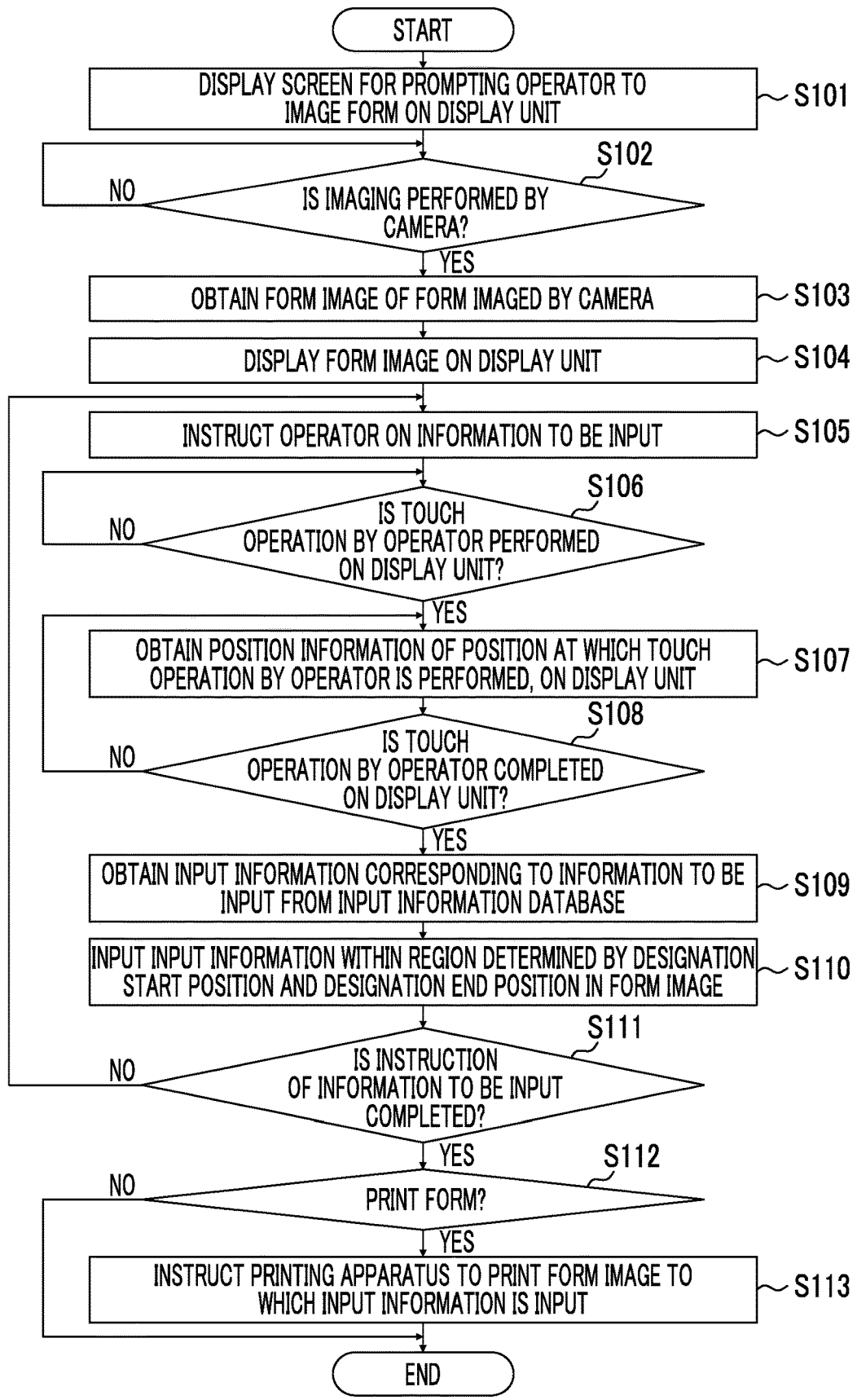

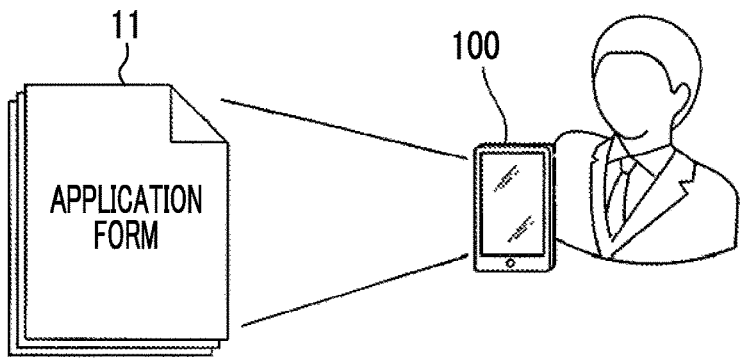

APPLICATION FORM FOR RESIDENT CARD AND THE LIKE

| KAWASAKI CITY | | | | HEISEI | YEAR | MONTH | DAY |
|---|---|---|---|---|---|---|---|
| ① WHO NEEDS PROOF? | | | | | | | |
| ADDRESS | TOKYO WARD | | | | | | |
| NAME | | | MR/MS | BIRTH DATE | MEIJI TAISHO SHOWA HEISEI YEAR MONTH DAY | | |
| ② NECESSARY DOCUMENT | ☐ RESIDENT CARD ☐ XXXXXXX ☐ XXX ☐ XXXXX ☐ XXX | COPY OF ALL MEMBERS | NUMBER | XXXXXXXXXXXXXXXXX | | | |
| | | COPY OF SOME MEMBERS | NUMBER | XXXXXXX | | | |
| | | COPY OF ALL MEMBERS | NUMBER | | | | |
| | | COPY OF SOME MEMBERS | NUMBER | XXXXXXXXX | | | |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-055648 filed Mar. 22, 2019.

BACKGROUND

(i) Technical Field

The present invention relates to an information processing apparatus and a non-transitory computer readable medium storing a program.

(ii) Related Art

For example, JP2016-206926A discloses an image forming apparatus including an application form selection receiving unit which receives selection of an application form having a field for inputting personal information, a personal identification information input receiving unit which receives an input of personal identification information, a personal information obtaining unit which unlocks an IC card based on the input identification information and obtains personal information recorded in the IC card, an application form generating unit which generates an application form based on a template of the selected application form and the personal information obtained from the IC card, and an application form output unit which outputs the generated application form.

SUMMARY

In the related art, there is a system for inputting information of an operator such as personal information or the like in a form such as an application form or the like, for example. In this system, for example, in a case where the operator designates an input field in a form such as an application form or the like, information of the operator corresponding to the designated input field is input by using information stored in a terminal or the like. However, since it is necessary to register in advance information in a form such as an application form or the like, for example, the system cannot deal with a case where a form generated by handwriting is displayed as an image and information of an operator is input.

Aspects of non-limiting embodiments of the present disclosure relate to an information processing apparatus and a non-transitory computer readable medium storing a program capable of inputting information to be input without registering information of a form in advance.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a display section that displays an image; an instruction section that instructs an operator on information to be input; a detecting section that detects a designation position on the display section on which the image is displayed; and an input section that inputs input information corresponding to the information to be input instructed by the instruction section, in a region determined by a designation start position and a designation end position in the image.

BRIEF DESCRIPTION OF THE DRAWINGS

Exemplary embodiment(s) of the present invention will be described in detail based on the following figures, wherein:

FIG. 5 is a flowchart illustrating an example of a procedure of a process of the operation terminal;

FIGS. 6A to 6C are diagrams for explaining a specific example of the process of the operation terminal;

FIGS. 7A and 7B are diagrams for explaining another specific example of the process of the operation terminal;

FIG. 8 is a diagram illustrating an example of a case where a text exists in an input range;

FIGS. 10A to 10C are diagrams for explaining an example in a case where an input field has two or more stages and designation is performed without a finger being released from a display unit.

DETAILED DESCRIPTION

Hereinafter, exemplary embodiment(s) of the present invention will be described in detail with reference to drawings.

Overall Configuration of Information Processing System

Figure 1:
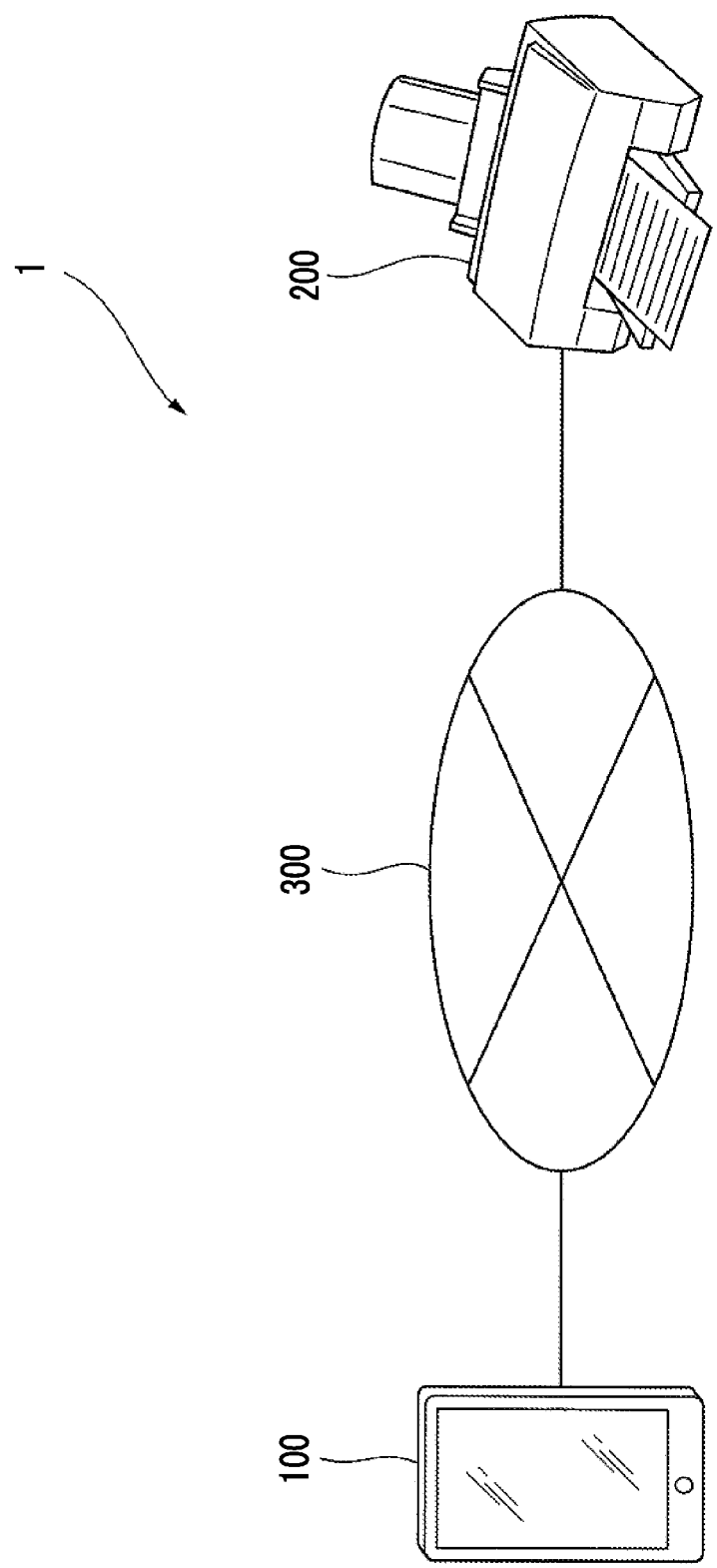
FIG. 1 is a diagram illustrating an example of an overall configuration of an information processing system according to the present exemplary embodiment.

FIG. 1 is a diagram illustrating an example of an overall configuration of an information processing system 1 according to the present exemplary embodiment. As illustrated in FIG. 1, the information processing system 1 according to the present exemplary embodiment includes an operation terminal 100 and a printing apparatus 200. The operation terminal 100 and the printing apparatus 200 are connected to a network 300.

The operation terminal 100 as an example of an information processing apparatus is a computer apparatus which receives an operation from an operator, and includes, for example, a portable information terminal such as a smartphone or a tablet terminal, a personal computer (PC), and the like. The operation terminal 100 is used by the operator to input information in a form such as an application form, for example. Although details will be described below, for example, the operation terminal 100 displays an image (hereinafter, referred to as "form image") of a form such as an application form, or instructs the operator on information to be input, and inputs the information to a form image based on an operation of the operator.

The printing apparatus 200 is an apparatus which performs printing by forming an image on a sheet as an example of a recording medium. As the printing apparatus 200, an apparatus having only a print function may be used, but in addition to the print function, an apparatus having another image processing function such as a copy function, a scanning function, and a facsimile function may be used.

The network 300 is a communication section used for information communication between the operation terminal 100 and the printing apparatus 200, and is, for example, an internet, a public line, or a local area network (LAN). The network 300 may be a wired communication network or a wireless communication network.

Hardware Configuration of Operation Terminal

Figure 2:
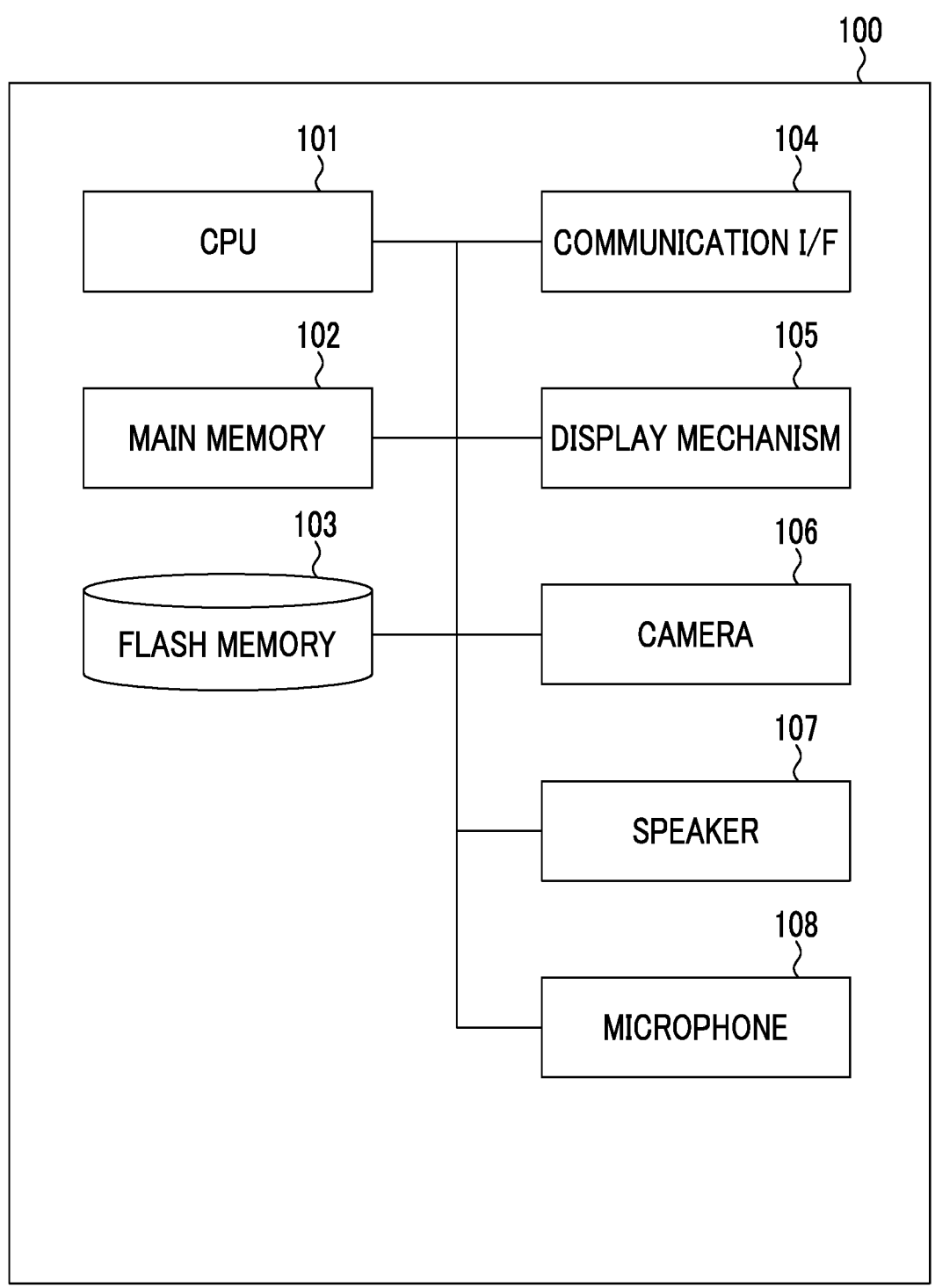
FIG. 2 is a diagram illustrating an example of a hardware configuration of an operation terminal according to the present exemplary embodiment.

FIG. 2 is a diagram illustrating an example of a hardware configuration of the operation terminal 100 according to the present exemplary embodiment. The operation terminal 100 according to the present exemplary embodiment includes a central processing unit (CPU) 101, and a basic memory 102 and a flash memory 103 as storage sections. The CPU 101 executes various software such as an operating system (OS) and an application, and executes various functions described below. The basic memory 102 is a storage region for storing various software, data used for the execution, and the like. The flash memory 103 is a storage region for storing input data for various programs, output data from various programs, and the like.

Further, the operation terminal 100 includes a communication interface (communication I/F) 104 which communicates with an outside, a display mechanism 105 which displays an image, a camera 106 which images an object, a speaker 107 which emits a sound, and a microphone 108 which collects a sound.

Here, the display mechanism 105 displays an image, and receives an operation from an operator. The display mechanism 105 is configured to include a display panel which is configured of a liquid crystal display or the like, a touch panel which is disposed on the display panel to detect that an operator performs a touch, a physical key to be pressed by the operator, and the like. For example, the display mechanism 105 displays various images on the display panel, and receives an operation from the operator by using the touch panel and the physical key.

As a section for detecting a contact on the touch panel, any section may be used such as a section which detects a pressure caused by the contact, a section which detects an electrostatic charge of a contacted substance, and the like. In addition, in the following description, an operation in which a finger of an operator touches a touch panel is described as a touch operation, but the touch operation is not limited to the touch operation by the finger of the operator. For example, the touch operation may be performed by a stylus pen or the like held by the operator. Further, the operation terminal 100 may include an input device such as a keyboard or a mouse.

Functional Configuration of Operation Terminal

Figure 3:
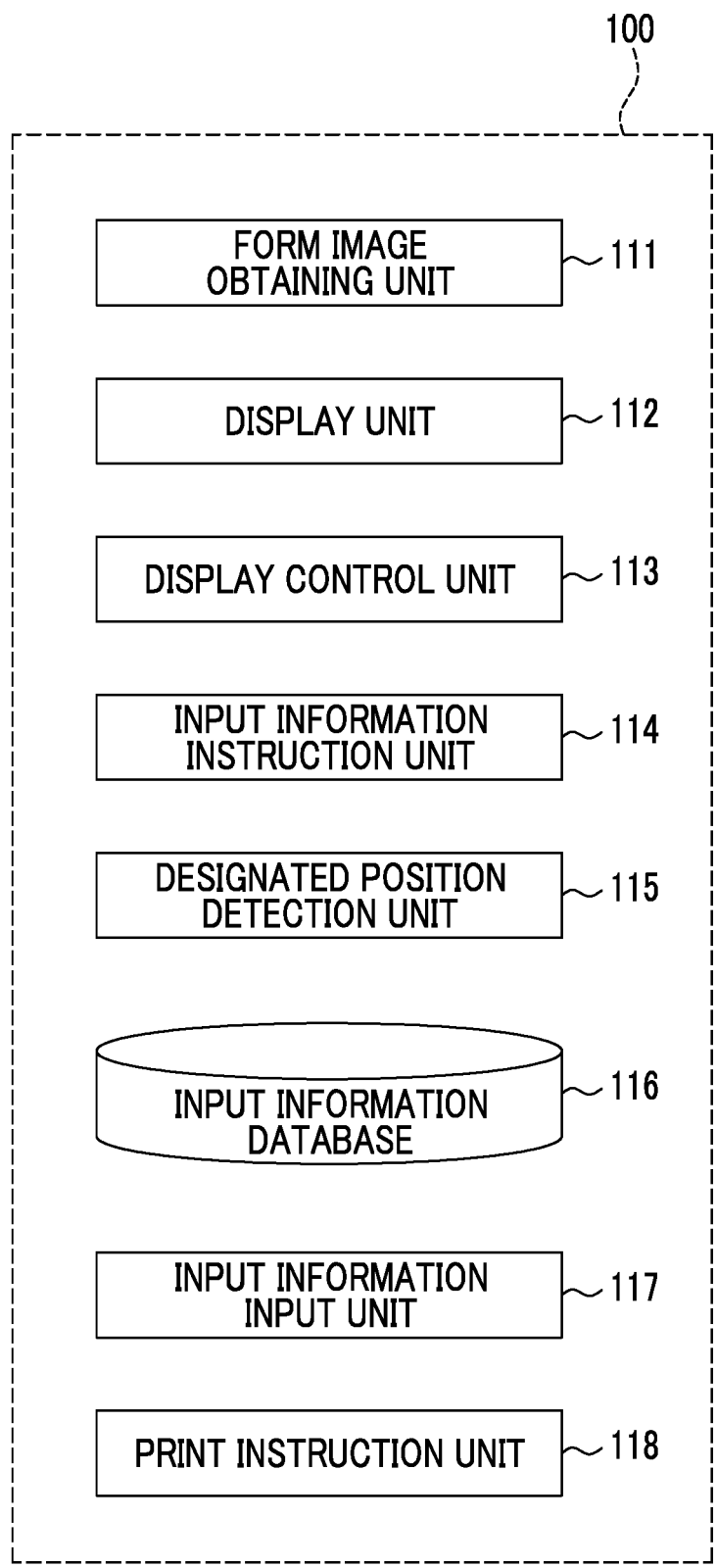
FIG. 3 is a block diagram illustrating an example of a functional configuration of the operation terminal according to the present exemplary embodiment.

FIG. 3 is a block diagram illustrating an example of a functional configuration of the operation terminal 100 according to the present exemplary embodiment. The operation terminal 100 according to the present exemplary embodiment includes a form image obtaining unit 111, a display unit 112, a display control unit 113, an input information instruction unit 114, a designated position detection unit 115, an input information database 116, an input information input unit 117, and a print instruction unit 118.

The form image obtaining unit 111 obtains a form image of a form imaged by the camera 106.

Here, in a case where an operator writes information such as a name or an address of the operator on a sheet of a form such as an application or the like, the camera 106 images the sheet of the form. The form image obtaining unit 111 obtains a form image of the imaged sheet.

The display unit 112 is a display panel of the display mechanism 105, and displays various images. For example, the display unit 112 displays the form image obtained by the form image obtaining unit 111.

The display control unit 113 generates a control signal for controlling a display on the display unit 112, and controls the display on the display unit 112. For example, the display control unit 113 controls the display unit 112 to display the form image obtained by the form image obtaining unit 111.

The input information instruction unit 114 instructs the operator on information to be input. The input information instruction unit 114 instructs the operator on information to be input in a state in which a form image is displayed on the display unit 112, for example. However, in a case where the input information instruction unit 114 instructs the information to be input, another image different from the form image may be displayed on the display unit 112.

In general, in many cases, in a form such as an application, for example, information is obtained by inputting a name, an address, a birth date, and the like. An item of information to be input is determined in advance, and the input information instruction unit 114 instructs to input the information of the predetermined item.

In a case where there are a plurality of items of information to be input, an order of the input instruction is also predetermined. For example, in a case where a name, an address, a birth date are determined as information to be input, an order of an instruction to first input the name, an instruction to next input the address, and an instruction to finally input the birth date is predetermined.

The designated position detection unit 115 detects a position designated by the operator on the display unit 112 in a state in which a form image is displayed on the display unit 112. For example, on the display unit 112, the designated position detection unit 115 detects a position touched by a touch operation of the operator.

More specifically, for example, on the display unit 112, in a case where a finger of the operator touches the display unit 112, the designated position detection unit 115 obtains position information (that is, coordinate information) of a touched position. In addition, the designated position detection unit 115 detects that the touch operation is performed while the finger of the operator is in contact with the display unit 112, and obtains position information of a position at which the touch is performed.

Figure 4:
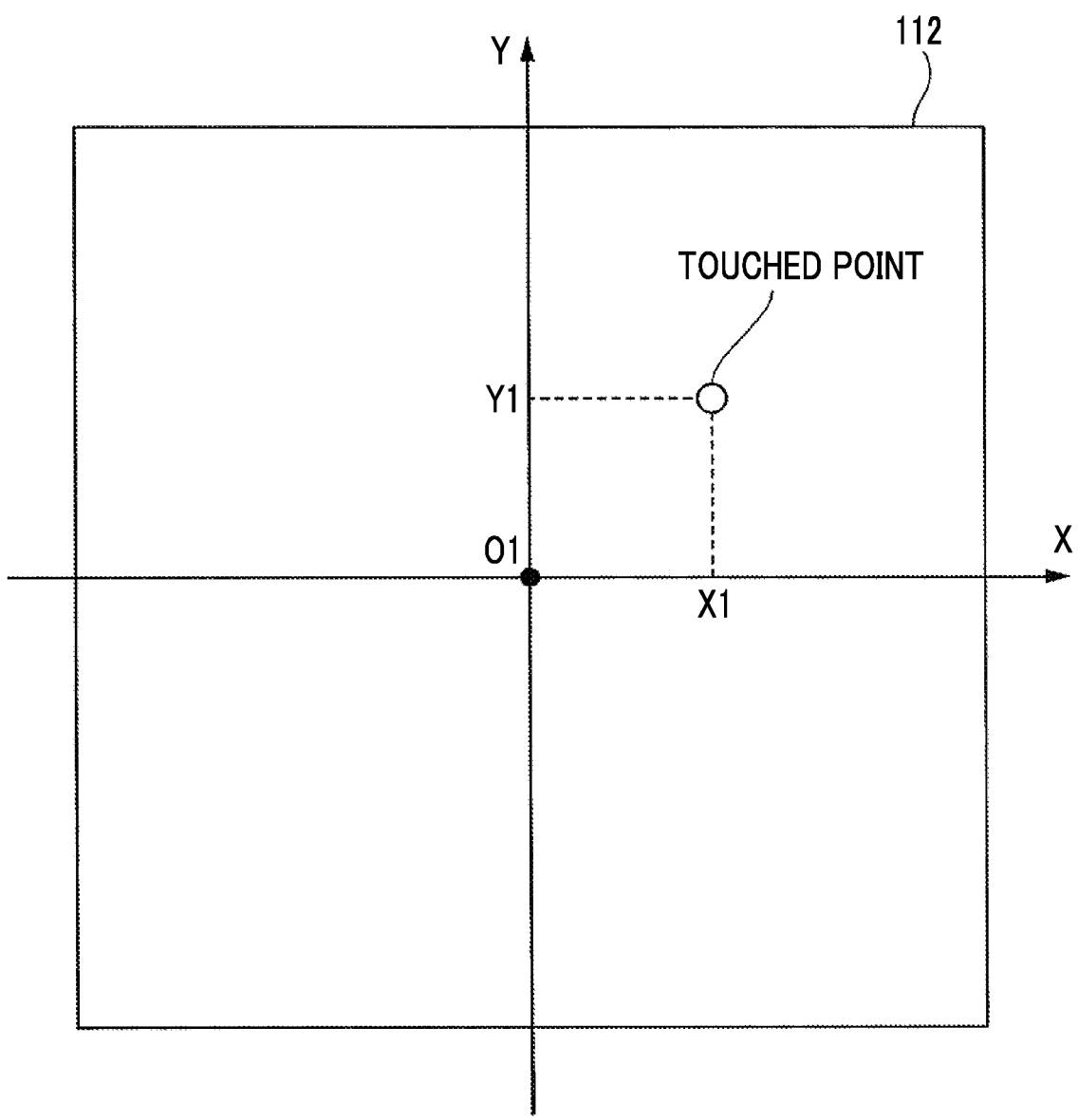
FIG. 4 is a diagram illustrating an example of coordinates in a display unit.

FIG. 4 is a diagram illustrating an example of coordinates in the display unit 112. In the example illustrated in FIG. 4, an orthogonal coordinate system is set in the display unit 112, a center of the display unit 112 is an origin O1 of (0, 0), a horizontal direction of the display unit 112 is an X-axis (right in the diagram is positive), and a vertical direction is a Y-axis (upward in the diagram is positive). For example, with a shape of the display unit 112 as a reference, a horizontal frame of the display unit 112 is the X-axis, and a vertical frame of the display unit 112 is the Y-axis. In addition, a unit of a value of coordinates is the number of pixels counted from the origin O1. When a finger touches the display unit 112, the designated position detection unit 115 detects an X-coordinate (X1) and a Y-coordinate (Y1) of a touched point.

Further, the designated position detection unit 115 determines, for example, a type of a touch operation such as "tap", "drag", "flick", or the like. "Tap" is an operation in which the finger of the operator touches a screen by lightly tapping on the screen. In a case where the tap operation is performed, it is assumed that the designated position detection unit 115 receives designation of the tapped position. In addition, "drag" is an operation in which the operator moves the finger while the finger of the operator is in contact with the screen. "Flick" is an operation in which the operator releases the finger to move the finger while the finger is in contact with the display unit 112. In a case where the drag operation or the flick operation is performed, it is assumed that the designated position detection unit 115 receives designation of a touched position while the contact operation is performed.

In the following description, in some cases, in a form image, a position at which the operator starts designation (that is, a position at which the operator starts contact) is referred to as "designation start position". In addition, the designation start position is a position at which the operator starts contact on the display unit 112. Further, in some cases, in the form image, a position (that is, a position at which the operator completes the contact) at which the operator completes the designation is referred to as "designation end position". In addition, the designation end position is a position at which the operator releases the finger from the display unit 112.

The input information database 116 is a database which stores information (hereinafter, information corresponding to the information to be input is referred to as "input information") corresponding to information to be input instructed by the input information instruction unit 114. Here, input information of the operator is registered in advance for each item of information to be input, in the input information database 116. For example, in a case where information to be input is "name", "Fuji Taro (富上 太郎)" is registered as a name of an operator. In addition, for example, in a case where information to be input is "address", "Tokyo A ward B town" is registered as an address of the operator.

The input information input unit 117 inputs input information corresponding to information to be input instructed by the input information instruction unit 114 within a region determined by a designation start position and a designation end position in a form image.

Here, as the input information, input information corresponding to information to be input instructed by the input information instruction unit 114 is obtained from the input information database 116. For example, in a case where information to be input is "name", a name of the operator of "Fuji Taro (富上 太郎)" is obtained. In the form image, "Fuji Taro (富十 太郎)" is input within a region determined by a designation start position and a designation end position.

In this manner, the input information input unit 117 inputs the input information within the region determined by the designation start position and the designation end position in the form image. Hereinafter, in some cases, the region determined by the designation start position and the designation end position in the form image is referred to as an "input range".

The print instruction unit 118 instructs the printing apparatus 200 to print a form image to which input information is input. For example, in a case where an instruction of the input information instruction unit 114 is completed, a print instruction button for receiving an instruction to print a form is displayed on the display unit 112. In a case where the operator instructs printing by the print instruction button, the print instruction unit 118 instructs the printing apparatus 200 to print a form image in which input information is input. Here, the print instruction unit 118 transmits image data of the form image to which the input information is input, to the printing apparatus 200. In a case of receiving the print instruction from the print instruction unit 118 and the image data of the form image, the printing apparatus 200 forms a form image on a sheet based on the received image data and performs printing.

Each of functional units constituting the operation terminal 100 is realized by cooperation of software and hardware resources. Specifically, for example, in a case where the operation terminal 100 is realized by the hardware configuration illustrated in FIG. 2, the CPU 101 executes various programs stored in the basic memory 102, the flash memory 103, or the like, so that functional units of the form image obtaining unit 111, the display control unit 113, the input information instruction unit 114, the designated position detection unit 115, the input information input unit 117, the print instruction unit 118, and the like illustrated in FIG. 3 are realized. In addition, the display unit 112 is realized by the display mechanism 105. Further, the input information database 116 is realized by, for example, the flash memory 103.

In the present exemplary embodiment, the display unit 112 is used as an example of a display section. The input information instruction unit 114 is used as an example of an instruction section. The designated position detection unit 115 is used as an example of a detecting section. The input information input unit 117 is used as an example of an input section.

Process Procedure of Operation Terminal

Next, a procedure of a process of the operation terminal 100 will be described. FIG. 5 is a flowchart illustrating an example of the procedure of the process of the operation terminal 100.

Hereinafter, in some cases, a process step is described as a symbol of "S".

For example, an operator activates an application for inputting input information to a form image on the operation terminal 100. In a case where the application is activated, for example, the display control unit 113 displays a screen for prompting the operator to image a form such as an application form or the like on the display unit 112 (S101).

Next, the form image obtaining unit 111 determines whether or not the camera 106 performs imaging (S102). Here, for example, in a case where the operator images a sheet of a form such as an application or the like with the camera 106, the determination is positive (YES) in S102. In a case where the determination is positive (YES) in S102, the form image obtaining unit 111 obtains a form image of the form imaged by the camera 106 (S103). On the other hand, in a case where the determination is negative (NO) in S102, the process of S102 is subsequently performed.

Next, the display control unit 113 displays the form image obtained by the form image obtaining unit 111 on the display unit 112 (S104). Next, the input information instruction unit 114 instructs the operator on information to be input (S105). Next, the designated position detection unit 115 determines whether or not a touch operation by the operator is performed on the display unit 112 (S106).

In a case where the determination is negative (NO) in S106, the process of S106 is subsequently performed.

On the other hand, in a case where the determination is positive (YES) in S106, the designated position detection unit 115 obtains position information of a position at which the touch operation by the operator is performed, on the display unit 112 (S107). Here, the designated position detection unit 115 continues to obtain position information of a position at which contact is performed while the finger of the operator is in contact with the display unit 112.

Next, the designated position detection unit 115 determines whether or not the touch operation by the operator is completed on the display unit 112 (S108). Here, after the touch operation of the operator is started, while the finger of the operator is in contact with the display unit 112, the determination is negative (NO) in S108. On the other hand, in a case where the finger of the operator is released from the display unit 112, assuming that the touch operation by the operator is completed, the determination is positive (YES) in S108.

In a case where the determination is negative (NO) in S108, the process of S107 is subsequently performed. On the other hand, in a case where the determination is positive (YES) in S108, the input information input unit 117 obtains input information corresponding to information to be input instructed by the input information instruction unit 114 from the input information database 116 (S109). Next, the input information input unit 117 inputs the obtained input information within a region (that is, an input range) determined by a designation start position and a designation end position in the form image (S110). In this case, the input information input unit 117 inputs the input information after determining the designation start position and the designation end position in the form image.

Next, the input information instruction unit 114 determines whether or not the instruction of information to be input is completed (S111). Here, in a case where there is a plurality of items of information to be input and there is information which is not instructed to be input yet, the determination is negative (NO). On the other hand, in a case where it is instructed to input all of information, the determination is positive (YES).

In a case where the determination is negative (NO) in S111, the process moves to S105. On the other hand, in a case where the determination is positive (YES) in S111, the print instruction unit 118 determines whether or not to print the form (S112). For example, in a case where non-print is instructed by the print instruction button displayed on the display unit 112, or in a case where print is not instructed, the determination is negative (NO) in S112. On the other hand, for example, in a case where print is instructed by the print instruction button, the determination is positive (YES) in S112.

In a case where the determination is negative (NO) in S112, the present process flow is completed. On the other hand, in a case where the determination is positive (YES) in S112, the print instruction unit 118 instructs the printing apparatus 200 to print the form image to which the input information is input (S113). Thus, the present process flow is completed.

Specific Example of Process of Operation Terminal

Next, a process of the operation terminal 100 will be described by using a specific example. FIGS. 6A to 7B are diagrams for explaining a specific example of the process of the operation terminal 100. In this example, an application form 11 for applying for a resident card is used as an example of a form.

Steps described below (that is, a symbol of "S") respectively correspond to the steps in FIG. 5.

First, a screen for prompting an operator to image a form is displayed (S101), and the operator images the application form 11 as illustrated in FIG. 6A. In a case of imaging the application form 11, as illustrated in FIG. 6B, a form image 12 of the imaged application form 11 is displayed on the display unit 112 (YES in S102, S103, and S104).

Next, the input information instruction unit 114 instructs the operator on information to be input (S105). For example, the input information instruction unit 114 instructs the operator to input a name as the information to be input. Specifically, the input information instruction unit 114 transmits a voice such as "please input your name" from the speaker 107. In addition, the input information instruction unit 114 may display a message such as "please input your name" on the display unit 112.

Next, according to the instruction of the input information instruction unit 114, the operator touches the display unit 112 with a finger so as to trace an input field of the name. In the form image 12 illustrated in FIG. 6B, the name is input to an input field 13. As illustrated in FIG. 6C, the operator touches the finger so as to trace a part or all of the input field 13. By such a touch operation, the designated position detection unit 115 detects a touched position, and obtains position information of the position at which the touch is performed (YES in S106 and S107).

In addition, in a case where the operator releases the finger from the display unit 112 (YES in S108), the touch operation is completed. Here, in the example illustrated in FIG. 6C, a position 14 is a designation start position, and a position 15 is a designation end position. Further, a region 16 is a region touched by the finger of the operator. In a case where the touch operation is completed, the input information input unit 117 obtains a name of the operator as input information corresponding to information to be input instructed by the input information instruction unit 114, from the input information database 116 (S109). In this example, "Fuji Taro (富士 太郎)" is registered in the input information database 116 as the name of the operator, and the input information instruction unit 114 obtains "Fuji Taro (富士 太郎)".

Next, the input information input unit 117 inputs "Fuji Taro (富士 太郎)" within an input range determined by the position 14 which is a designation start position and the position 15 which is a designation end position in the form image 12 (S110). Here, for example, the input information input unit 117 sets the region 16 touched by the finger of the operator, as the input range. The input information input unit 117 inputs "Fuji Taro (富士 太郎)" to fit in the region 16.

In addition, an interval between texts may be an interval in which input texts are within the input range (in this example, the region 16). For example, the input information input unit 117 uniformly assigns texts of "Fuji Taro (富士 太郎)" to the region 16 and inputs the texts. In addition, for example, a relationship between a length of the input range and the interval of the texts may be determined in advance, and the interval of the texts corresponding to a length X of the region 16 in a horizontal direction (see FIG. 6C) may be calculated. Further, for example, as long as a standard text interval is determined and the texts fit within the region 16, the text may be input with the standard text interval.

In addition, in a case of a name, a space may be provided between a first name and a last name. For example, in a case of "Fuji Taro (富士 太郎)", the input information input unit 117 inputs an interval between "ji (士)" and "Ta" so as to be larger than an interval between other texts (for example, an interval between "Fu (富)" and "ji (士)" or an interval between "Ta (太)" and "ro (郎)").

Figures 7A, 7B:
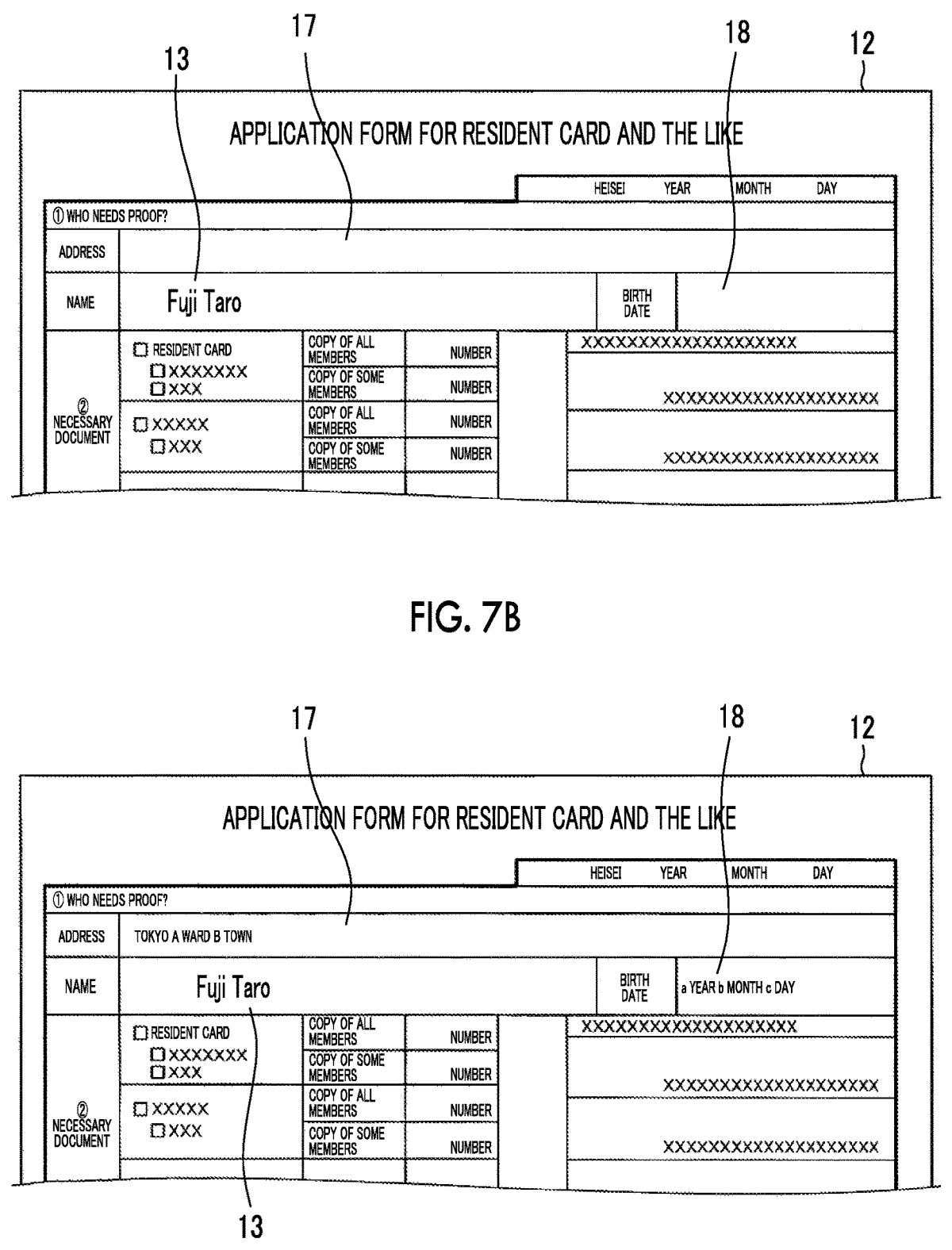

Further, a size of the texts may be such that the input texts are within the input range (in this example, the region 16). For example, a relationship between a height of the input range and the size of the texts may be determined in advance, and the input information input unit 117 may calculate the size of the texts corresponding to a height Y of the region 16 in a vertical direction (see FIG. 6C). In addition, for example, a relationship between an area of the input range and the size of the texts may be determined in advance, and the size of the texts corresponding to an area of the region 16 may be calculated. Further, for example, as long as a standard text size is determined and the texts fit within the region 16, the text may be input with the standard size. In this example, as illustrated in FIG. 7A, "Fuji Taro (富士 太郎)" is input in the input field 13.

Next, in a case where information other than the name is determined as information to be input (NO in S111), the input information instruction unit 114 continues to instruct the operator on the information to be input. In this example, it is assumed that an address and a birth date are determined as information other than the name. The input information instruction unit 114 instructs the operator to input an address as information to be input. The operator may touch the finger so as to trace an input field 17 of the address (see FIG. 7A). Next, the input information instruction unit 114 instructs the operator to input a birth date as information to be input. The operator may touch the finger so as to trace an input field 18 of the birth date (see FIG. 7A). As a result, as illustrated in FIG. 7B, an address of the operator and a birth date of the operator are respectively input to the input field 17 and the input field 18.

In a case of instructing the operator to input all information (YES in S111), it is determined whether or not the form is to be printed (S112). Here, in a case where the operator instructs to print the form image 12 (YES in S112), the print instruction unit 118 instructs the printing apparatus 200 to print the form image 12 in which input information is input. The print instruction unit 118 transmits image data of the form image 12 to which the input information is input, to the printing apparatus 200. In the printing apparatus 200, printing of the form image 12 in which the input information is input is performed. In this example, the operator may apply for a resident card by using the printed sheet.

In this example, although the input range is set to the region 16 touched by the finger of the operator, the present exemplary embodiment is not limited to such a configuration.

For example, in some cases, the input field is larger than the region touched by the finger of the operator. In the example illustrated in FIG. 6C, the input field 13 of the name is larger than the region 16. Therefore, the input information input unit 117 may set the input range to a range larger than the region 16. The range larger than the region 16 is, for example, a region obtained by enlarging the region 16 at a predetermined ratio, or a region obtained by adding a specific height or a specific length to the region 16. In addition, for example, the input information input unit 117 performs image analysis on a periphery of the region 16, and in a case where there is a region which includes the region 16 and which is divided by ruled lines, the region may be used as the input range. In this case, the input field 13 becomes the input range.

Further, the input information input unit 117 may change a size of texts of input information according to pressure caused by the contact of the operator.

For example, the input information input unit 117 predetermines a relationship between the pressure caused by the contact and the size of the texts, and calculates a size of the texts corresponding to the pressure when the finger of the operator being touched. Here, as described above, the size of the character to be input may be changed in consideration of the pressure by the contact in addition to a height and an area of the region touched by the finger of the operator.

Process in Case Where Text Exists in Input Range

A case where a text exists in advance in an input range according to a form may be considered. In this case, the input information input unit 117 inputs input information in a range without a text within the input range. That is, the input information input unit 117 inputs the input information so as not to overlap with the already existing text in the input range. Hereinafter, a process in a case where a text exists in an input range will be described.

Process of Specifying Existing Text in Input Range and Inputting Input Information In a case where there is a text in an input range, for example, the input information input unit 117 performs a text recognition process by optical character recognition (OCR), specifies which text specifically exists in the input range, and inputs input information. The OCR is a technology for analyzing a text existing on image data and converting the text into text data handled by a computer.

FIG. 8 is a diagram illustrating an example of a case where a text exists in an input range. In a form image 19 illustrated in FIG. 8, a text of "Tokyo" and "ward" exists in an input field 20 of an address. In addition, a region 21 is a region traced by the operator while the finger of the operator is in contact with the input field 20. In a case where the region 21 is an input range, a text such as "Tokyo" and "ward" exists in the input range. Here, in a case where input information is input, the input information input unit 117 performs image analysis so as to determine whether or not a text exists in the input range. In a case where the input information input unit 117 determines that the text exists in the input range, the input information input unit 117 further performs a text recognition process so as to specify the text existing in the input range. In this example, the text existing in the input range is specified as "Tokyo" and "ward".

Next, the input information input unit 117 compares the text existing in the input range with the input information. In the text existing in the input range, a text included in the input information is specified.

In this example, the text of "Tokyo" and "ward" exists in the input range. On the other hand, it is assumed that input information, which is "Tokyo A ward B town", is registered as an address of the operator. In this case, "Tokyo" and "ward" are specified as a text included in the input information.

Next, the input information input unit 117 divides the input information by the specified text of "Tokyo" and "ward". As a result, "Tokyo A ward B town" of the input information is divided into four texts of "Tokyo", "A", "ward" and "B town". Among these four texts, the input information input unit 117 inputs the remaining "A" and "B town" into the input range except for "Tokyo" and "ward" existing in the input range. That is, "A" is input between "Tokyo" and "ward" existing in the input range, and "B town" is input after "ward".

In addition, "ward" is a text which exists in the input range and is also included in the input information. Further, in the input information, texts of "A" and "B town" exist before and after "ward". That is, "ward" is a text included in the input information, and is a text having other texts before and after "ward". The input information input unit 117 divides the input range based on "ward", and inputs "A" and "B town" to each of the divided input ranges. Here, "ward" is used as an example of a text satisfying a predetermined condition.

In this manner, the input information input unit 117 compares the text existing in the input range with the input information so as to specify a text for dividing the input range, such as "ward". In addition, "ward" may be registered in advance as a text for dividing an input range in a case where an address is input.

For example, as a text for dividing an input range, "city" of Yokohama city, Kawasaki city, or the like exists in addition to "ward". Here, "city" may be registered in advance as a text for dividing an input range in a case where an address is input. In a case where "city" exists in the input field, the input range is divided, and input information is input in spaces before and after "city".

Further, for example, as in an input field 23 in FIG. 8, "Year", "Month", and "Day" may exist as a text of a birth date. Here, "Year" and "Month" may be registered in advance as a text for dividing an input range in a case where a birth date is input. In a case where "Year" exists in the input field of a birth date, the input range is divided, and input information is input in spaces before and after "Year". The same manner is also applied to "Month".

In this manner, a text for dividing an input range may be registered in advance according to an item of information to be input.

In addition, a text of "Mr/Ms" exists in an input field 22 of a name in FIG. 8. Here, in a case where the operator traces the input field 22 and a case where a region before "Mr/Ms" is traced and "Mr/Ms" is not traced, the input information input unit 117 inputs a name (for example, "Fuji Taro (富士 太郎)") of the operator before "Mr/Ms" without performing the text recognition process. On the other hand, in a case where the operator traces the input field 22 and a case where the region before "Mr/Ms" and "Mr/Ms" are traced, the input information input unit 117 performs the text recognition process so as to specify the text of "Mr/Ms".

"Mr/Ms" is a text not included in "Fuji Taro (富士 太郎)" of input information. The input information input unit 117 selects whether to input input information before "Mr/Ms" or to input the input information after "Mr/Ms". Here, in the input field 22, there is a space before "Mr/Ms" for inputting a text, but there is no space after "Mr/Ms" for inputting a text. Therefore, the input information input unit 117 selects to input "Fuji Taro (富士 太郎)" before "Mr/Ms".

In addition, for example, a threshold value is predetermined for a size of a range in which the input information can be input. The input information input unit 117 inputs input information in a range having a size equal to or larger than the threshold value, and does not input the input information to a range having a size smaller than the threshold value. In this example, a range before "Mr/Ms" is a range having a size equal to or larger than the threshold value, and a range after "Mr/Ms" is a range having a size smaller than the threshold value.

In this manner, in a case where a text not included in input information exists in an input range, the input information input unit 117 inputs the input information based on a size of a space before and after the text.

In addition, in a case of inputting a name, "Mr/Ms" may be registered in advance such that input information is input before "Mr/Ms" and the input information is not input after "Mr/Ms". In this case, based on registered information relate to "Mr/Ms", the input information input unit 117 inputs "Fuji Taro (富士 太郎)" before "Mr/Ms".

In the same manner, for example, in a case of inputting a name, "Esq" may be registered in advance such that input information is input before "Esq" and the input information is not input after "Esq".

Further, for example, in a case of inputting an address, a text of "address" described on the left side of the input field 20 (see FIG. 8) of an address may be registered in advance such that input information is not input before "address" and the input information is input after "address".

In this manner, in accordance with an item of information to be input, input information may be input or may be registered in advance to either of regions before and after each of texts.

Process of Inputting Input Information Based on Operation to Avoid Text

In a case where a text exists in an input field, the operator may perform an operation of moving a contact position so as to avoid the text. In this case, based on an operation of the operator, the input information input unit 117 determines that there is a text in the input field, and inputs input information.

Figure 9:
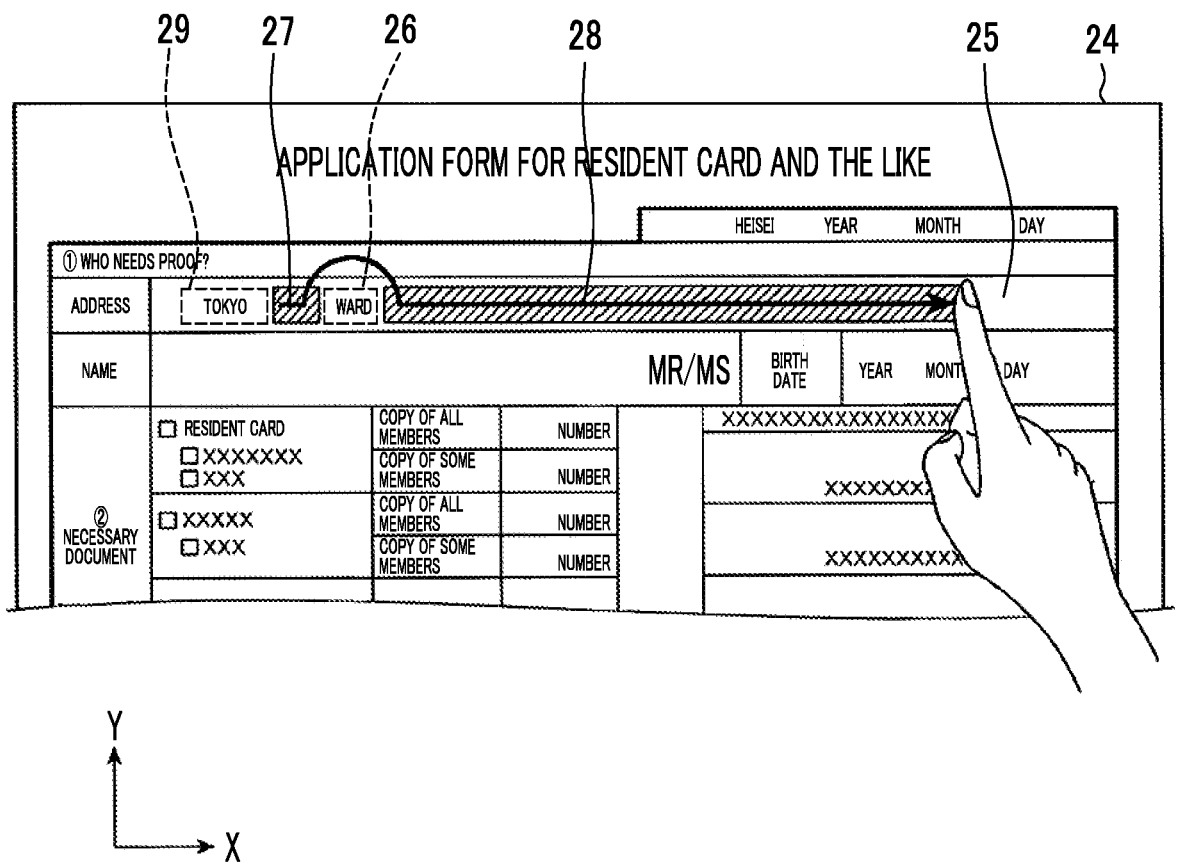
FIG. 9 is a diagram illustrating an example of an operation of avoiding a text.

FIG. 9 is a diagram illustrating an example of an operation of avoiding a text.

In a form image 24 illustrated in FIG. 9, a text of "Tokyo" and "ward" exists in an input field 25 of an address. Here, in a case of tracing the input field 25, the operator avoids the text of "Tokyo" and "ward" and brings a finger into contact with the other region so as to move a contact position. Specifically, as illustrated by the arrow in the diagram, after the operator brings the finger into contact with a region 27 on the right side of "Tokyo", the operator moves the finger upwards in the form image 24 not to trace a text of "ward". After tracing a region above "ward", the finger is moved downward in the form image 24 so as to trace the input field 25 again, and the finger is brought into contact with a region 28 on the right of "ward".

In addition, as a basic operation of the operator, an operation of moving the contact position in the X-axis direction is registered in advance. Further, as an operation of avoiding a text (hereinafter, referred to as "text avoidance operation"), after the basic operation, an operation in which the contact position is moved in a direction different from a moving direction of the basic operation, and the contact position is returned to a region extending the contact position of the previous basic operation in a right direction (that is, a positive X-axis direction) is registered in advance. In a case where the text avoidance operation is performed after the basic operation is performed, the input information input unit 117 determines that there is a text between a contact region before the contact position moves in a direction different from the basic operation and a contact region when the contact position is moved again by the basic operation. In the example illustrated in FIG. 9, the input information input unit 117 determines that there is a text a region 26 between the region 27 which is a contact region before the contact position moves in a direction different from the basic operation and the region 28 which is a contact region when the contact position is moved again by the basic operation.

Here, in a case where input information of "Tokyo A ward B town" is registered as an address of the operator, "Tokyo A ward B town" is divided into four of "Tokyo", "A", "ward", and "B town" in advance. In addition, among "Tokyo", "A", "ward", and "B town", in a case where it is determined that a text exists in an input field, it is predetermined that "A" and "B town" are input in order. In a case where it is determined that a text exists in the region 26, the input information input unit 117 inputs "A" and "B town" in order, out of "Tokyo A ward B town" of the input information. Specifically, the input information input unit 117 inputs "A" to the region 27 and inputs "B town" to the region 28.

In addition, an input range of this example is, for example, a range determined by the region 26 to the region 28 (or a range determined by the region 27 and the region 28). For example, the input information input unit 117 divides the input information into the region 27 and the region 28 divided by the region 26, and inputs the input information to each of the region 27 and the region 28.

In this manner, by predetermining a part of an address to be input from the input information of the address, the input information is input in order. However, according to a form, in some cases, for example, in a case of inputting a prefecture name first, input information is input from a ward or city. The operator may be instructed which part of the address is to be input.

For example, items such as "input from prefecture name", "input from ward name", "input from city name", and the like are displayed on the display unit 112. In a case of a form in which a ward name is input first in the input field of an address, the operator selects "input from ward name". In a case where the operator selects "input from ward name", out of "Tokyo A ward B town" of input information, the input information input unit 117 inputs "A" and "B town" in order.

The moving direction of the contact position in the basic operation is not limited to the X-axis direction. For example, the moving direction may be inclined from the X-axis direction by several degrees. Further, for example, with the input field 25 as a reference, a direction along a ruled line surrounding the input field 25 may be a moving direction of the contact position in the basic operation. In addition, a threshold value may be set to a moving distance of the contact position in the basic operation. For example, in a case where the moving distance of the contact position is equal to or larger than the threshold value, this operation may be determined as a basic operation, and in a case where the moving distance of the contact position is smaller than the threshold value, this operation may not be determined as the basic operation.

In the present exemplary embodiment, the X-axis direction of the basic operation is used as an example of a predetermined direction.

In addition, the text avoidance operation can be, for example, an arc-shaped operation or a convex-shaped operation. Further, for example, the text avoidance operation can be an operation of moving the contact position in a right direction (that is, a positive X-axis direction) of the form image 24 and from an upper direction (a positive Y-axis direction) to a lower direction (a negative Y-axis direction) of the form image 24. In addition, for example, the text avoidance operation may be an operation of moving the contact position in a right direction (that is, the positive X-axis direction) of the form image 24 and from the lower direction (the negative Y-axis direction) to the upper direction (the positive Y-axis direction) of the form image 24. Further, the text avoidance operation is an operation of returning the contact position to a portion overlapping all or a part of a Y-coordinate of the contact position of the previous basic operation, for example. In the example illustrated in FIG. 9, a Y-coordinate of the region 28 overlaps with all or a part of a Y-coordinate of the region 27.

Further, in a case where it is determined that a text exists by the text avoidance operation, the input information input unit 117 may perform the text recognition process. In the example illustrated in FIG. 9, the input information input unit 117 performs the text recognition process on the region 26. In addition, the text recognition process is also performed on a region 29 before the region 27. The input information input unit 117 specifies "ward" of the region 26 and "Tokyo" of the region 29. In this case, out of "Tokyo A ward B town" of input information, the input information input unit 117 inputs the remaining "A" and "B town" except for "Tokyo" and "ward" specified by the character recognition to the region 27 and the region 28.

Process of inputting Input Information in Input Field of Birth Date

In a case of inputting a birth date, an input may be performed in a Western calendar or an input may be performed in a Japanese calendar. In a case of the input in the Japanese calendar, in some cases, a Japanese era name is marked, as in the input field 23 of FIG. 8. In this case, in the input field 23, the input information input unit 117 encloses a text corresponding to the Japanese era name of input information with a circle or a square, and marks the text of the Japanese era name.

For example, in the input field 23 in FIG. 8, in a case where the operator traces "Meiji/Taisho/Showa/Heisei", the input information input unit 117 determines that a text exists in an input range, and performs a text recognition process. In this example, texts existing in the input range are specified as "Meiji", "Taisho", "Showa", and "Heisei". Here, the input information input unit 117 determines that the input is an input in the Japanese calendar by "Meiji", "Taisho", "Showa", and "Heisei" being used as the Japanese era name. In a case where there are at least two instead of all four of "Meiji", "Taisho", "Showa", and "Heisei", it may be determined that the input is an input in the Japanese calendar.

Here, for example, it is assumed that input information "Showa (昭和) Year (年) 60 Month (月) 1 Day (日) 1" is registered as a birth date of the operator. In this case, among "Meiji", "Taisho", "Showa", and "Heisei", the input information input unit 117 marks a text of "Showa" by enclosing "Showa" with a circle or a square.

In a case where input information is registered in the Western calendar, for example, "Jan. 1, 1985", the input information input unit 117 converts the birth date of the input information from the Western calendar to the Japanese calendar. That is, "Jan. 1, 1985" is converted into "Showa (昭和) Year (年) 60 Month (月) 1 Day (日) 1". In "Meiji/Taisho/Showa/Heisei", a text of "Showa" is marked.

Next, in the input field 23 in FIG. 8, in a case where the operator traces a location at which "Year", "Month", and "Day" are described, the input information input unit 117 determines that a text exists in an input range, and performs the text recognition process. In this example, the text existing in the input range is specified as "Year", "Month", and "Day". In the same manner as the process of inputting the input information of the address in the input field 20 in FIG. 8, the input information input unit 117 inputs input information of a birth date. In this example, in input information of "Showa (昭和) Year (年) 60 Month (月) 1 Day (日) 1", the remaining "60", "1" and "1" except for "Showa", "Year", "Month", and "Day" of the Japanese era name, in the input range.

Here, in some cases, a text related to the Western calendar or the Japanese calendar is described in the input field of the birth date, such as "Western calendar", "Japanese calendar", "Heisei", or the like. In a case where the input information instruction unit 114 instructs to input a birth date, the operator may determine which of the Western calendar and the Japanese calendar is to be used by the input information input unit 117 by tracing a text such as "Western calendar", "Japanese calendar", "Heisei", or the like. In addition, in a case where the operator does not trace the text, the input information input unit 117 may perform the text recognition process on a periphery of the region traced by the operator to search for a text related to the Western calendar or the Japanese calendar. In a case where it is determined that the input is an input in the Japanese calendar, for example, the input information input unit 117 may mark any of texts "Meiji", "Taisho", "Showa", and "Heisei" or inputs a birth date including the Japanese era name such as "Showa (昭和) Year (年) 60 Month (月) 1 Day (日) 1".

In addition, in a case where the input information instruction unit 114 instructs to input a birth date, the operator may be inquired as to which of the Western calendar or the Japanese calendar to be used for an input. In this case, for example, after the operator instructs which of the year and the Japanese calendar is to be used for the input on the display unit 112, the operator brings a finger into contact with an input field of a birth date and trances the input field.

As a default (that is, an initial setting) input format, it is predetermined whether the Western calendar is to be used or the Japanese calendar is to be used for an input. For example, as a case of Japan, in a case where a text such as "Meiji", "Taisho", "Showa", "Heisei", "Western calendar", "Japanese calendar", or the like is not described in a form, an input is performed in the default input format. In a case of the Japanese calendar, such as "Showa (昭和) Year (年) 60 Month (月) 1 Day (日) 1", a birth date also including the Japanese era name is input.

In addition, in this example, the process of marking the Japanese era name of a birth date is described, but the same process can be performed on "prefecture" of the address field, for example. For example, as a case of Japan, in the address field, one of texts of "district 1 (都)", "district 2 (道)", "district 3 (府)", and "district 4 (県)" is marked. In a case where the operator traces "district 1 (都)", "district 2 (道)", "district 3 (府)", and "district 4 (県)", the input information input unit 117 performs the text recognition process, and specifies texts of "district 1 (都)", "district 2 (道)", "district 3 (府)", and "district 4 (県)". Therefore, a process of marking one of the texts is performed. For example, in a case where input information of "Kanagawa (神奈川) district (県)" is registered as an address of the operator, among "district 1 (都)", "district 2 (道)", "district 3 (府)", and "district 4 (県)", the input information input unit 117 marks a text of "district 4 (県)" by enclosing "district 4 (県)" with a circle or a square. In addition, the input information input unit 117 inputs input information of "Kanagawa (神奈川)" in a space before "district 4 (県)".

For example, as a case of the United States of America, it is assumed that "66-4 Parkhurst Rd, Chelmsford Mass. 18240", "337 Russell St, Hadley Mass. 10350", "5360 Southwestern Blvd, Hamburg N.Y. 14075 USA", "350 E Fairmount Ave, Lakewood N.Y. 14750", or the like exists in the address field. In a case where the operator traces a text such as "Rd", "St", "Blvd", "Ave", or the like, the input information input unit 117 performs the text recognition process so as to specify the text of "Rd", "St", "Blvd", "Ave", or the like. For example, in a case where input information of "Russell" is registered as an address of the operator, the input information input unit 117 inputs the input information of "Russell" to a space before "St".

Process in Case of Two or More Input Fields

In some cases, there is a form including an input field having stages equal to or more than two. In a case where there is the input field having two or more stages, for example, the operator performs an operation of designating the input field having the two or more stages without releasing a finger from the display unit 112 or an operation of designating each of the stages of the input field by releasing the finger, so that input information is input to the input field having the two or more stages.

Operation of Specifying without Releasing Finger

Figures 10A, 10B, 10C:
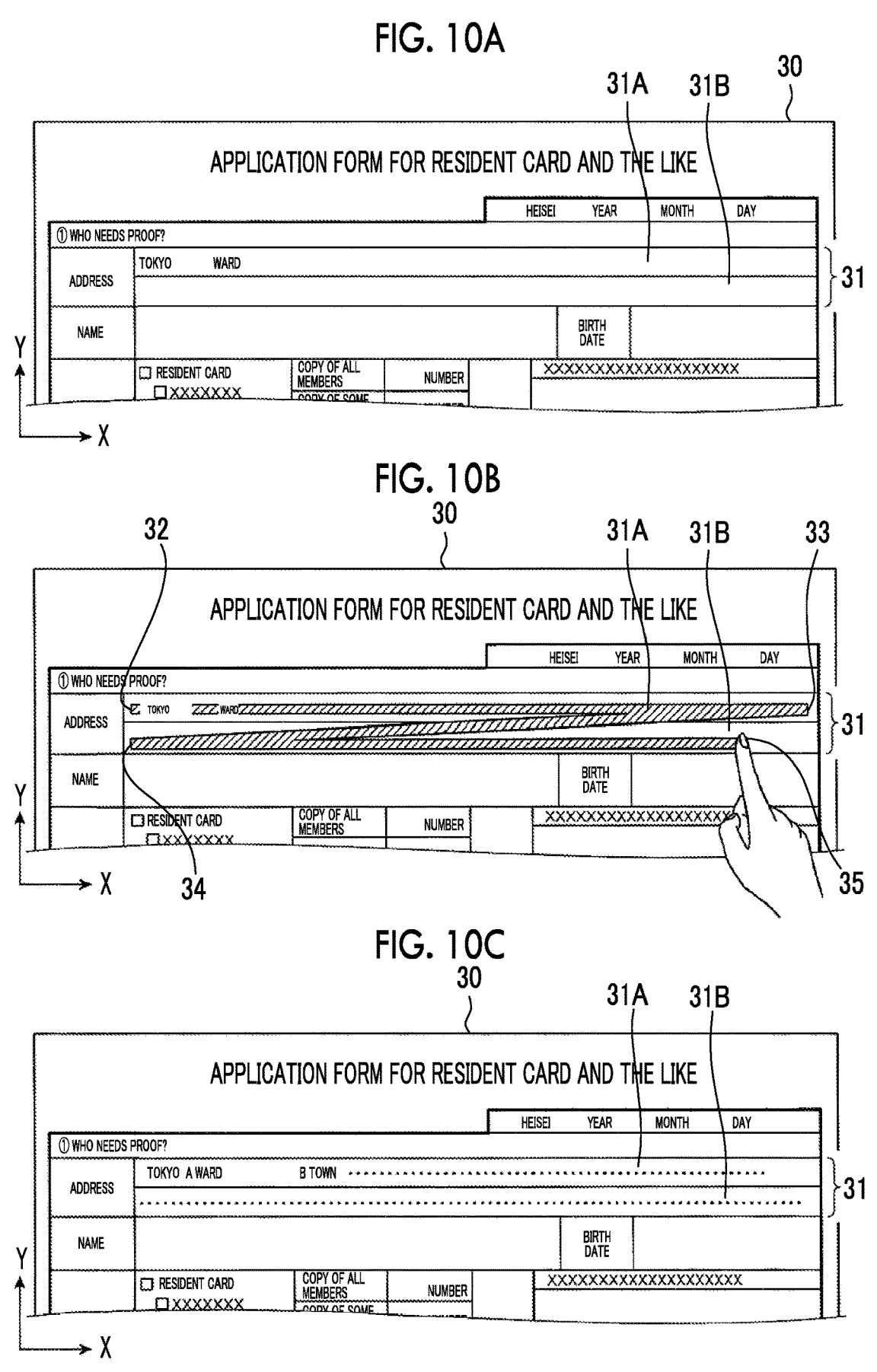

FIGS. 10A to 10C are diagrams for explaining an example in a case where an input field has two or more stages and designation is performed without a finger being released from the display unit 112.

In the example illustrated in FIGS. 10A to 10C, a case where the number of stages of an input field is two will be described as an example, but even in a case where the number of stages of the input field is three or more, the same process is performed, and input information is input to the input field having the three or more stages.

In a form image 30 illustrated in FIG. 10A, an input field 31 of an address is configured to include two stages of an input field 31A and an input field 31B.

Here, as illustrated in FIG. 10B, after the operator starts a touch operation from a position 32 of the input field 31A and moves a contact position in the X-axis direction, the operator changes a moving direction of the contact position at a position 33. Specifically, at the position 33, the operator changes the moving direction of the contact position from the position 33 toward a position 34. In addition, after the operator moves the contact operation to the position 34, at the position 34, the operator changes the moving direction of the contact position again in the X-axis direction, and moves the contact position in the input field 31B. The operator releases the finger from the display unit 112 at a position 35, and completes the touch operation.

In addition, in the same manner as the example in FIG. 9, as a basic operation of the operator, an operation of moving a contact position in the X-axis direction is registered in advance. In addition, as an operation (hereinafter, referred to as "two-stages designation operation") used in a case of designating an input fields with two stages, an operation of moving a contact position in a direction with an angle equal to or larger than a specific size with respect to the X-axis direction is registered in advance. After a basic operation is performed, the input information input unit 117 performs a two-stages designation operation. In a case where the basic operation is started again, it is determined that the input field has two or more stages. Input information is divided into the two or more stages of the input field. In this example, as illustrated in FIG. 10C, the input information input unit 117 divides and inputs the input information into the input field 31A and the input field 31B.

In the example illustrated in FIG. 10B, after the contact position is moved from the position 32 in the X-axis direction, an operation from the position 33 to the position 34 is started, so that the input information input unit 117 determines that the two-stages designation operation is started. In a case where the two-stages designation operation is started, the input information input unit 117 stops the designation of the input range. In addition, in a case where a moving direction of the contact position is changed into the X-axis direction at the position 34, the input information input unit 117 determines that the two-stages designation operation is completed. In a case where the two-stages designation operation is completed, the input information input unit 117 restarts designation of the input range. In a case where the moving operation is completed at the position 35, the input information input unit 117 completes the designation of the input range. By performing such a process, the input information input unit 117 divides input information into the input field 31A and the input field 31B, with the position 32 as a designation start position and the position 35 as a designation end position.

The two-stages designation operation is an operation of moving a contact position in a direction with an angle equal to or larger than a specific size with respect to a moving direction of the contact position in a basic operation, and the angle equal to or larger than the specific size is, for example, an angle with 5 degrees or more.

In addition, the two-stages designation operation is, for example, an operation of moving the contact position in an oblique direction based on the X-axis direction. The oblique direction is, for example, a downward direction of the form image 30 (for example, a negative Y-axis direction) and a left direction (for example, a negative X-axis direction).

However, the two-stages designation operation is not limited to the operation of moving the contact position in one direction. In the two-stages designation operation, for example, the moving direction of the contact position may be changed, or a trajectory of the contact position may be curved.

In addition, in this example, as in the input field 31A and the input field 31B, a case in which the two-stages designation operation is performed with the configuration in which the input fields are arranged up and down is described, but the two-stages designation operation may be performed even with a configuration in which the input fields are not arranged up and down. For example, in a case where a two-stages designation operation is performed on input fields disposed apart, the input information input unit 117 divides and inputs input information for each of the input fields disposed apart. Further, for example, the text avoidance operation of the example in FIG. 9 may be included in the two-stages designation operation. Specifically, as illustrated in FIG. 9, in a case where the operator traces the input field 25 (see FIG. 9) while the operator avoids "Tokyo" and "ward", the input information input unit 117 determines that the two-stages designation operation is performed. The input information is divided and input to an input range determined by the region 27 and the region 28. In the present exemplary embodiment, the two-stages designation operation is used as an example of a predetermined operation.

Operation of Designation of Releasing Finger for Each Stage of Input Field

In addition, in a case of designation by releasing a finger for each stage of an input field, the two-stages designation operation is an operation of restarting a contact within a predetermined time after the contact is completed. The predetermined time is, for example, one second. This operation can also be performed with a configuration in which the input fields are not arranged up and down.

Specifically, as illustrated in FIG. 10B, after the operator starts a moving operation from the position 32 of the input field 31A and moves a contact position in the X-axis direction, the operator releases the finger from the display unit 112 at the position 33. After the operator starts a moving operation from the position 34 of the input field 31B and moves a contact position in the X-axis direction within a predetermined time, the operator releases the finger from the display unit 112 at the position 35 and completes the moving operation.

Here, after the contact position is moved from the position 32 in the X-axis direction, a contact is restarted within the predetermined time after the finger is released at the position 33, so that the input information input unit 117 determines that the two-stages designation operation is performed. In a case where the finger is released at the position 33, the input information input unit 117 stops the designation of the input range. In addition, in a case where a contact is restarted at the position 34, the input information input unit 117 determines that the two-stages designation operation is completed. In a case where the two-stages designation operation is completed, the input information input unit 117 restarts designation of the input range. Further, since a contact is restarted within the predetermined time after the finger is released at the position 35, the input information input unit 117 completes the designation in the input range by completing the moving operation without performing the two-stages designation operation. By performing such a process, the input information input unit 117 divides input information into the input field 31A and the input field 31B, with the position 32 as a designation start position and the position 35 as a designation end position.

Other Operation Example

As another example, an operation of simultaneously designating two input fields may be set to a two-stages designation operation. This operation can also be performed with a configuration in which the input fields are not arranged up and down.

For example, in the example illustrated in FIG. 10B, the operator brings a finger into contact with the position 32 of the input field 31A and moves the finger in the X-axis direction, while the operator brings another finger into contact with the position 34 in the input field 31B and moving the finger in the X-axis direction. The operator releases the finger at the position 33 in the input field 31A, and releases the other finger at the position 35 in the input field 31B.

In this manner, in a case where the operation of designating the two input fields is performed, the input information input unit 117 determines that a two-stages designation operation is performed. In the input field 31A, the position 32 is a designation start position, and the position 33 is a designation end position. In addition, in the input field 31B, the position 34 is a designation start position, and the position 35 is a designation end position. The input information input unit 117 provides an input range in each of the input field 31A and the input field 31B, and divides and inputs input information into the input field 31A and the input field 31B.

In this operation, it is sufficient in a case where there is a time to simultaneously designate two input fields, and it is not necessary to simultaneously start a contact with the two input fields or to simultaneously complete the contact with the two input fields.

As described above, in the operation terminal 100 according to the present exemplary embodiment, the operator instructs a form image according to an instruction of the input information instruction unit 114 so as to input input information in a region determined by the designation start position and the designation end position. In the operation terminal 100, since it is not necessary to register in advance what information is to be input in an input field of a form, input information can be input also for, for example, a form generated by handwriting.

Modification Example

Next, a modification example of the present exemplary embodiment will be described.

Example of Inputting Input Information in parallel with Movement of Contact Position In the example described above, the input information input unit 117 inputs input information after determining a designation start position and a designation end position. However, the input information input unit 117 may input the input information in parallel with a contact position of the operator being moved from the designation start position. In other words, the input information input unit 117 may input the input information while the contact position is moving.

Figure 11A:
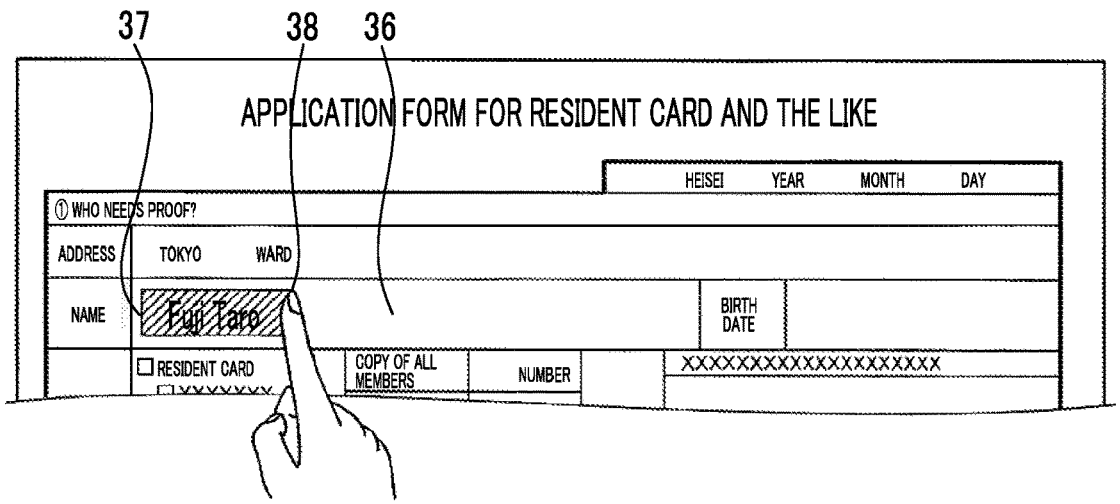
FIGS. 11A and 11B are diagrams illustrating an example of a process of inputting input information in parallel with a contact position being moved from a designation start position.
Figure 11B:
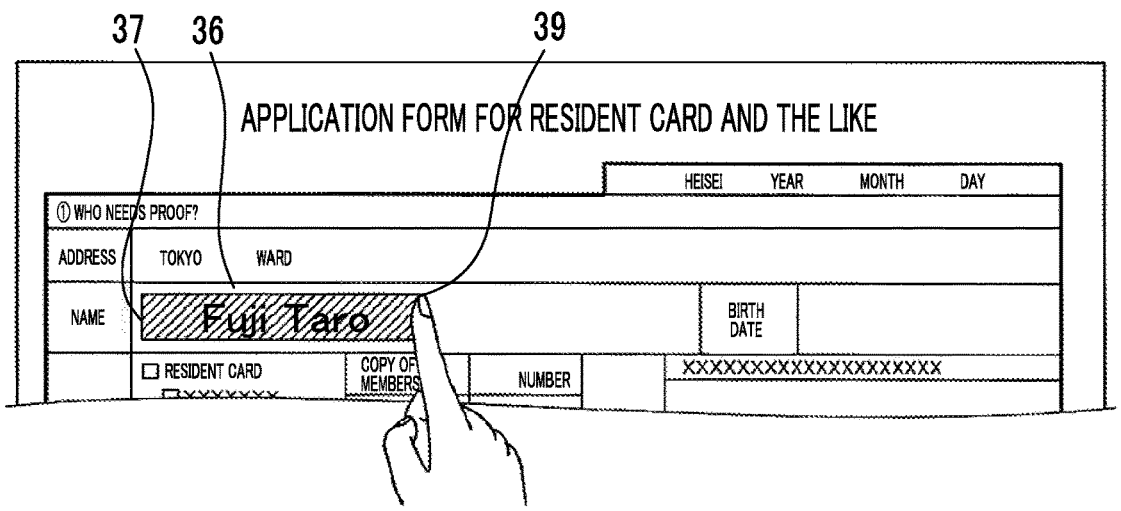

FIGS. 11A and 11B are diagrams illustrating an example of a process of inputting input information in parallel with a contact position being moved from a designation start position.

In the example illustrated in FIG. 11A, the operator starts a moving operation from a designation start position 37 in an input field 36 of a name. In addition, "Fuji Taro (富士 太郎)" is registered as a name of an operator. Here, in a case where the moving operation is started, the input information input unit 117 inputs "Fuji Taro (富士 太郎)" in a region determined by the designation start position 37 and a contact position of the operator. In the example illustrated in FIG. 11A, "Fuji Taro (富士 太郎)" is input in a region determined by the designation start position 37 and a position 38.

In addition, in the example illustrated in FIG. 11B, the operator further moves the contact position from a state illustrated in FIG. 11A in the input field 36 of a name, and becomes in a state in which the contact position is moved to a position 39. In this case, the input information input unit 117 inputs "Fuji Taro (富士 太郎)" in a region determined by the designation start position 37 and the position 39.

In a case of comparing FIG. 11A and FIG. 11B, in the example illustrated in FIG. 11B, a text of "Fuji Taro (富士 太郎)" is large and a space between texts of "Fuji Taro (富士 太郎)" is large, as compared with the example illustrated in FIG. 11A.

In this manner, a size of a text of input information and an interval between texts are adjusted in accordance with movement of a contact position.

Here, for example, the input information input unit 117 may not change the size of the text while the interval between the texts of the input information is changed in parallel with the movement of the contact position.

In addition, for example, while input information is input in parallel with movement of a contact position, a size of a text to be input may be changed according to a change of pressure caused by a contact of the operator.

Further, in a case where input information is input in parallel with a contact position being moved or a case where an operation is performed to return the contact position to a designation start position, the input information input unit 117 may delete the input information.

Figure 11C:
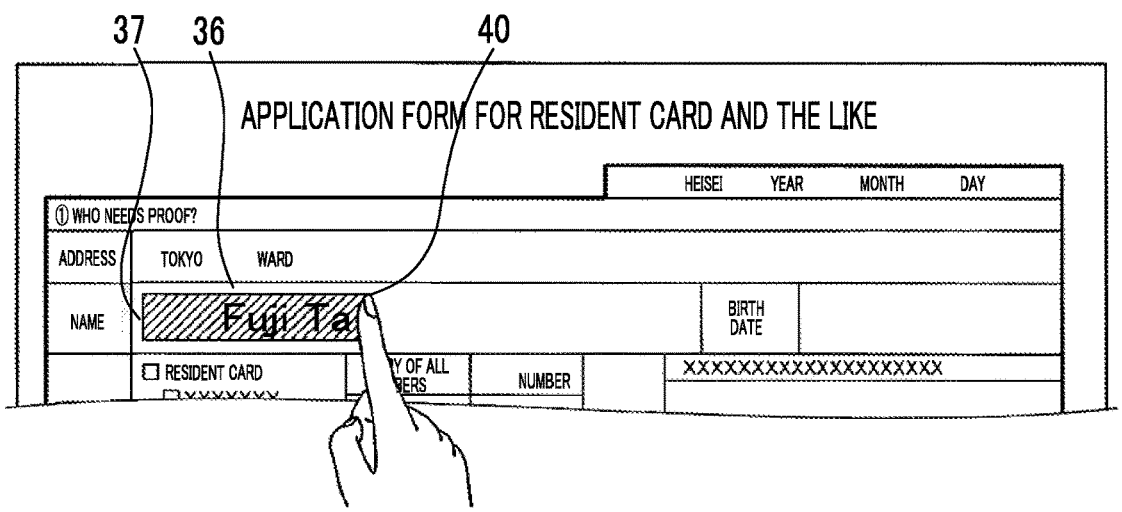
FIG. 11C is a diagram illustrating an example of a process of deleting the input information in a case of performing an operation of returning the contact position towards the designation start position.

FIG. 11C is a diagram illustrating an example of a process of deleting input information in a case of performing an operation of returning a contact position towards the designation start position 37.

The example illustrated in FIG. 11C illustrates a case where the operator performs an operation of returning a contact position toward the designation start position 37 from the state in FIG. 11B. Here, the operator returns the contact position toward the designation start position 37, and moves the contact position to a position 40 beyond a location at which "ro (郎)" is displayed in the input field 36 in FIG. 11B. By performing such an operation, the input information input unit 117 deletes a text of "ro (郎)" in the input information.

Here, in a case where the operator further performs an operation to return the contact position toward the designation start position 37, the input information is deleted in order according to the movement of the contact position. That is, the text to be input becomes "Fuji Ta (富士 太)", "Fuji (富士)", or "Fu (富)".

In a case where after the operator performs an operation of returning a contact position toward a designation start position at a specific position, the operator moves the contact position toward the specific position, the deleted input information may be input again. For example, in a case where the operator moves the contact position from the position 39 (see FIG. 11B) to the position 40 (see FIG. 11C), as illustrated in FIG. 11C, the input information input unit 117 deletes "ro (郎)". After then, in a case where the operator moves the contact position from the position 40 to the position 39, as illustrated in FIG. 11B, the input information input unit 117 inputs again the deleted "ro (郎)".

Further, in a case of performing an operation of returning the contact position toward the designation start position, the input information input unit 117 may delete all the texts of the input information without deleting the texts in order as illustrated in FIG. 11C. For example, in the example illustrated in FIG. 11B, in a case where an operation of returning the contact position from the position 39 to the designation start position 37 is performed, the input information input unit 117 deletes "Fuji Taro (富士 太郎)".

Further, in a case where the operator performs an operation of returning a contact position toward a designation start position at a specific position, and then moves the contact position toward the specific position, the deleted input information may be input again. For example, in a case where the operator moves a contact position from the position 39 (see FIG. 11B) to the designation start position 37, the input information input unit 117 deletes "Fuji Taro (富士 太郎)". After then, in a case where the operator moves the contact position to the position 39, as illustrated in FIG. 11B, the input information input unit 117 inputs again the deleted "Fuji Taro (富士 太郎)".

Further, in a case where the operator performs an operation of returning a contact position toward a designation start position at a specific position, and then releases a finger from the display unit 112 and brings the finger into contact with the display unit 112 again, the input information input unit 117 may delete the deleted input information again.

For example, in a case where the operator moves the contact position from the position 39 (see FIG. 11B) to the position 40 (see FIG. 11C), as illustrated in FIG. 11C, the input information input unit 117 deletes "ro (郎)". After then, in a case where the operator releases the finger from the display unit 112 and brings the finger into contact with the display unit 112 to move a contact position, the input information input unit 117 inputs again the deleted "ro (郎)" at the contact position as a reference. In addition, for example, in a case where the operator returns the contact position from the position 39 (see FIG. 11B) to the designation start position 37, the input information input unit 117 deletes "Fuji Taro (富士 太郎)". After then, in a case where the operator releases the finger from the display unit 112 and brings the finger into contact with the display unit 112 to move a contact position, the input information input unit 117 inputs again "Fuji Taro (富士 太郎)" at a position at which the contact starts as a designation start position.

In addition, in a case of performing an operation of returning a contact position towards the designation start position, it is not necessary to delete the input information only by narrowing the input range. For example, in a case where the operator performs an operation of returning a contact position toward the designation start position 37 from the state in FIG. 11B, the state may be as illustrated in FIG. 11A. That is, as compared with the case in FIG. 11B, the input information input unit 117 makes texts of "Fuji Taro (富士 太 郎)" smaller or narrows an interval between the texts of "Fuji Taro (富⼠ 太郎)".

As another example of deleting input information, for example, in a case where the operator instructs input information on a screen after the input information input unit 117 inputs input information, the screen which receives selection of whether to or not to delete the input information may be displayed. In a case where the operator selects to delete the input information, the input information input unit 117 deletes the input information selected to be deleted.

Example of Performing Text Recognition Process before Operator Designates Input Field The input information input unit 117 may perform a text recognition process on a form image before the operator performs an operation of designating an input field.

For example, in a case where the form image obtaining unit 111 obtains a form image, the input information input unit 117 performs the text recognition process on the entire form image. In addition, for example, in a case where the input information instruction unit 114 instructs the operator on information to be input, the input information input unit 117 performs the text recognition process on the entire form image. In this manner, by performing the text recognition process before the operator designates the input field, for example, when the operator designates the input field, a text existing in the designated input field is specified.

Other Modification Examples

In the example described above, although the item of the information to be input is determined in advance, the present exemplary embodiment is not limited to such a configuration.

For example, the input information instruction unit 114 may recognize a text of a location instructed by the operator in a form image and may instruct the operator on information to be input. For example, the operator brings a finger into contact with a location described as "name" in a form image and traces the location. By performing the text recognition process on the instructed location, the input information instruction unit 114 specifies that a text of "name" exists. In this case, the input information instruction unit 114 instructs the operator to input "name".

In addition, an item of information to be input is displayed on the display unit 112, and the operator may select the item. For example, the display unit 112 displays items such as "name", "address", "birth date", and the like. In a case where the operator selects "name", the input information instruction unit 114 instructs the operator to input "name".

Further, in the example described above, the operation terminal 100 includes a touch panel, and the operator touches the display unit 112 to perform an operation, but the present exemplary embodiment is not limited to such a configuration. For example, the operation terminal 100 may include a pointing device such as a mouse or the like, and the designated position detection unit 115 may detect a position designated by the operator with the pointing device on the display unit 112. In this case, a position at which the operator starts designation by the pointing device is a designation position, and a position at which the operator moves the designation start position and then completes the designation by the pointing device is a designation end position.

In the same manner, for example, the operation terminal 100 may include an input unit such as a physical key or the like, and the designated position detection unit 115 may detect a position designated by the operator with the physical key or the like on the display unit 112.

In addition, in the example described above, a sheet of a form such as an application form is imaged on the operation terminal 100, but the present exemplary embodiment is not limited to such a configuration. The form image may not be an image of a form imaged by the operation terminal 100. For example, the operation terminal 100 may obtain a form image imaged by another device, or may obtain a form image generated by the operator operating the operation terminal 100.

Further, in the present exemplary embodiment, another device may realize a part of the function of the operation terminal 100. For example, the input information database 116 may be provided in another device, and the input information input unit 117 may obtain input information from the input information database 116 of the other device. In addition, for example, the input information instruction unit 114 may be provided in another device, and the other device may instruct the operator on information to be input.

Further, a program for realizing the exemplary embodiment of the present invention can be provided by a communication section as well as provided by being stored in a recording medium such as a CD-ROM or the like.

Although various exemplary embodiments and modifications are described above, these exemplary embodiments and modifications may be combined with one another.

In addition, the present disclosure is not limited to the exemplary embodiment described above, and can be implemented in various forms without departing from the scope of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a hardware controller, configured:
to control a display to display an image of a form including an input field in the display;
to instruct an operator on information to be input in the input field;
to detect a touched position by the operator on the display on which the image is displayed,
to input input information corresponding to the information to be input instructed by the hardware controller, in a region determined by a designation start position and a designation end position,
when the operator performs a contact operation to trace the input field, wherein the designation start position is the touch position where the contact operation starts and the designation end position is the touched position where the touch operation is completed.

2. The information processing apparatus according to claim 1, wherein the hardware controller inputs the input information after the designation start position and the designation end position are determined.

3. The information processing apparatus according to claim 2,
wherein in a case where the region determined by the designation start position and the designation end position includes a text, the hardware controller inputs the input information in a portion of the region without the text.

4. The information processing apparatus according to claim 3,
wherein in a case where the text satisfies a predetermined condition, the hardware controller divides the region into a plurality of regions based on the text, and divides and inputs the input information into the plurality of regions.

5. The information processing apparatus according to claim 4,
wherein the predetermined condition is the text being included in the input information, and
the hardware controller divides the input information based on the text, removes the text from the input information, and divides and inputs the input information into the plurality of regions.

6. The information processing apparatus according to claim 1,
wherein in a case where a predetermined operation is performed while the designation position is moved from the designation start position to the designation end position, the hardware controller stops designating a range in response to the operation being started, and restarts designating the range in response to the operation being completed.

7. The information processing apparatus according to claim 6,
wherein the predetermined operation is an operation performed after the designation position is moved from the designation start position in a predetermined direction, and an operation of moving the designation position in a direction at an angle equal to or larger than a specific size with respect to the direction.

8. The information processing apparatus according to claim 1,
wherein the hardware controller inputs the input information in parallel with the movement of the designation position from the designation start position.

9. The information processing apparatus according to claim 8,
wherein in a case where an operation of returning the designation position to the designation start position is performed, the hardware controller deletes the input information which is input.

10. The information processing apparatus according to claim 1,
wherein the image of the form is obtained by capturing a sheet of a form by a camera.

11. The information processing apparatus according to claim 1,
wherein the input information is obtained by inputting at least a name, an address, and a birth date.

12. A non-transitory computer readable medium storing a program causing a computer to realize:
a function of instructing an operator on information to be input;
a function of detecting a touched position by the operator on a display on which an image of a form including an input field is displayed; and
a function of inputting input information corresponding to the instructed information to be input, in a region determined by a designation start position and a designation end position,
when the operator performs a contact operation to trace the input field, wherein the designation start position is the touch position where the contact operation starts and the designation end position is the touched position where the touch operation is completed.

13. An information processing method comprising the steps of:
displaying an image of a form including an input field in a display;
instructing an operator on information to be input in the input field;
detecting a touched position by the operator on the display on which the image is displayed; and
inputting input information corresponding to the information to be input instructed by a hardware controller, in a region determined by a designation start position and a designation end position,
when the operator performs a contact operation to trace the input field, wherein the designation start position is the touch position where the contact operation starts and the designation end position is the touched position where the touch operation is completed.

* * * * *